July 13, 1948.  A. P. GAUVREAU  2,445,110
OVERLOAD RELAY HAVING AN INSTANTANEOUS PRIMARY
MOVEMENT AND A DELAYED SECONDARY MOVEMENT
Filed Nov. 20, 1944  2 Sheets-Sheet 1

INVENTOR.
ALPHONSE P. GAUVREAU
BY
Frank H. Harmon
ATTORNEY

INVENTOR.
ALPHONSE P. GAUVREAU
BY
ATTORNEY

Patented July 13, 1948

2,445,110

UNITED STATES PATENT OFFICE 2,445,110

OVERLOAD RELAY HAVING AN INSTANTANEOUS PRIMARY MOVEMENT AND A DELAYED SECONDARY MOVEMENT

Alphonse Perron Gauvreau, East Cleveland, Ohio, assignor, by mesne assignments, to Jack & Heintz Precision Industries, Inc., Cleveland, Ohio, a corporation of Delaware Application November 20, 1944, Serial No. 564,329

4 Claims. (Cl. 175—294)

This invention relates to an overload relay for tripping electrical circuits.

The present relay is capable of general application but is designed primarily to fill an existing need for improved overload protection in circuits of various gear retraction electric motors as used in military aircraft, and the invention will be described with particular reference to such specific use. The problem involved and the functions accomplished, as described in connection with aircraft applications, is intended to exemplify the general class of applications to which the present relay is suited and is not to be interpreted in a limiting sense.

The present switch is intended to be in substitution for and an improvement on limit switches used to govern the travel of various retraction mechanisms for landing gear, bomb bay doors, wing flap devices, etc., wherein the limit switch functions to shut off motor power when a nut reaches the end of its travel along a rotating screw which actuates the mechanism. It is conventional practice to adjust conventional limit switches to be responsive to nut position along the screw. An objection to this arrangement is the absence of any provision or allowance for variance in travel speed of the nut or for the effects of inertia causing a variation in the coasting of moving parts after the power is shut off. Consequently, under conditions causing a slow cranking speed, such as high grease viscosity at low temperatures on the screw, low motor voltage, worn screw threads, or added load in some form or another, the conventional limit switch will shut off too soon causing the nut to stop travel at some distance short of the stop on the screw. Under conditions causing a fast cranking speed such as low grease viscosity due to temperature, high motor voltage or lessened load, the switch will shut off too late allowing the nut to meet the stop on the screw with an impact that may alter the setting of the limiting switch relative to the end of the screw. The foregoing preliminary discussion serves to emphasize that there are too many factors to allow for any satisfactory arrangement for setting limit switches for continuously satisfactory operation of retraction mechanisms and the like.

Further, conventional limit switches are inoperative if the nut never reaches the switch actuating position on the screw, as frequently happens upon the occurrence of some mechanical failure or binding in the system. In such event, when the gear is stalled, the electric retraction motor will continue to draw an objectionally large current.

It is, therefore, the object of the present invention to provide a current overload protector to open the power circuit on the occurrence of dangerously high current values. Another object of the invention is to eliminate the above noted shortcomings of limit switches by providing an overload relay which utilizes certain qualities inherent in retraction motors containing built-in clutches.

A further object is to provide an overload relay which will delay the opening of the circuit upon a slight overload but which will cause the circuit to open immediately upon the occurrence of a dangerously large surge of current.

A still further object is to provide an overload relay having an armature with primary and secondary movements wherein the secondary movement may be produced directly by an overload surge current exceeding a predetermined value, or may be produced in lagging relation to the primary movement by a continuous overload of less than said predetermined value.

When the present relay is used as a limit switch the nut operating the retraction gear is allowed to travel until it is arrested by the screw stop which, in turn, stops the motor shaft, it being assumed that there is no mechanical reason for not allowing the nut to actually engage the stop. In a conventional retraction motor the motor armature will continue to turn in such an event, slipping its clutch, which action by throwing a greater load on the motor causes it to lose speed and draw more current. This increase in current actuates the present relay which operates to shut off the power to the motor. Thus, with a properly operating mechanism the motor will never be stopped until the nut reaches the end of its travel along the screw, regardless of variations in the speed of its travel. Should binding of the nut or gear occur for any reason and the motor draw a high current, or should some motor defect cause it to draw a high current, the relay will function as an overload protector to shut off the power to the motor.

The present device is a current actuated relay which engages one set of contacts and separates a second set of contacts, and maintains them separated until released by an outside source, at a definite value of current over a wide range of values obtained by adjustment. A definite time lapse between occurrence of series actuating current and tripping over a wide range of lags from zero time can be obtained by an adjustable self-heated thermal lag. When subjected to motor starting currents, the present relay can be designed to not trip on motor starting surges many times the size of the actuating current.

The invention will now be described with particular reference to the accompanying drawings in which.

Figure 1:
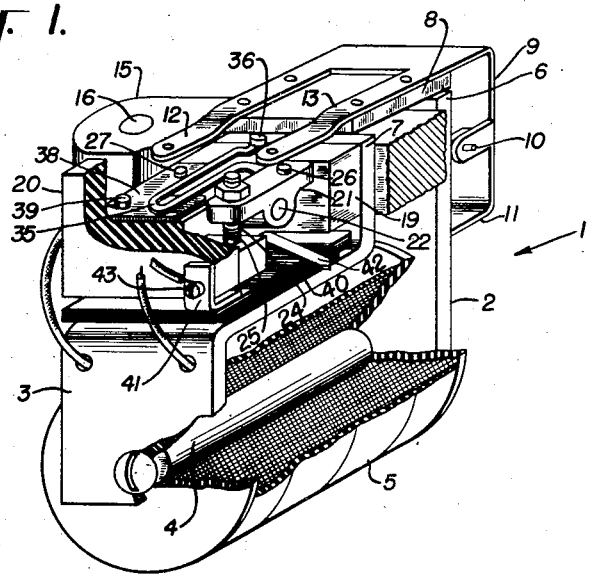
Figure 1 is a perspective view of a preferred embodiment with parts broken away to reveal the operation of other parts.
Figure 2:
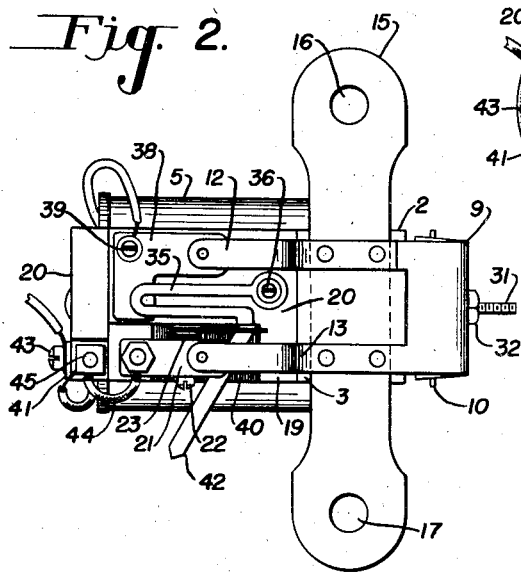
Figure 2 is a top plan view of the device shown in Figure 1.

The numeral 1 refers to the overload relay generally. The magnetic circuit for actuating the relay comprises a pair of iron members 2 and 3 joined by the core 4 of a coil 5. The members 2 and 3 terminate in pole pieces 6 and 7 arranged to attract a magnetic bridging element 8 on an armature 9. Armature 9 is mounted on the end member 2 by means of a pivotal support 10 and is provided on one side of the pivot with a balancing lever arm 11. On the other side of the pivot the armature carries a pair of contact arms 12 and 13, the contact arm 12 being relatively flexible and the contact arm 13 being relatively stiff. Included within the magnetic circuit is a large copper series bar 15 having connecting means 16 and 17 at its end for connection in series with the power circuit to the motor to be controlled. Screws 18 pass through the pole pieces 6 and 7 and the bar 15 and are secured in an insulating block 19 having an extension 20 to support various elements of the device.

Figure 4:
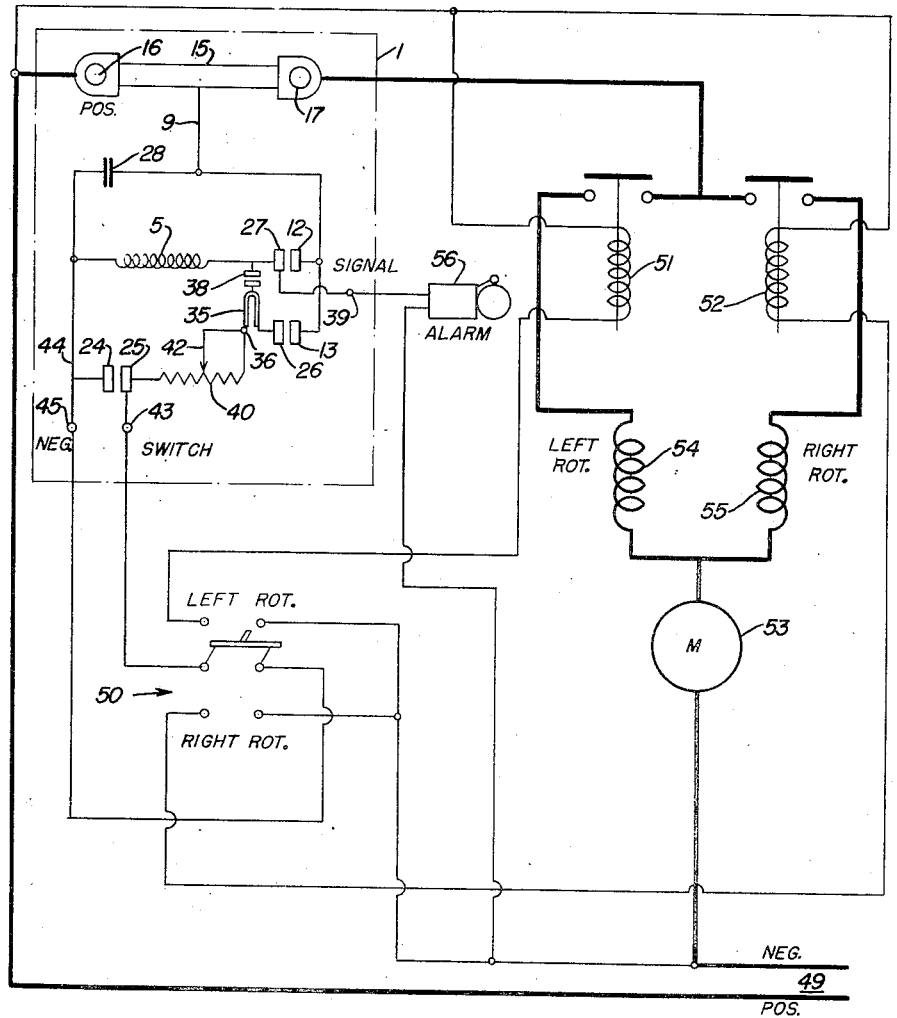
Figure 4 is a schematic wiring diagram in which the present relay is connected in circuit with the contactors for a reversible retraction motor.

An overload contact carrier 21 is mounted on a pivot 22 extending laterally from the block 20 and is actuated by a spring 23 to close a pair of contacts 24 and 25. The contact 25 is a stationary contact on the block 20 and the contact 24 is insulatedly mounted on an arm of the contact carrier 21. On the opposite side of its pivotal support the carrier 21 is provided with a contact 26 beneath the contact arm 13, the contact 26 being in electrical circuit with the carrier. The block 20 carries a contact 27 beneath the contact arm 12. These various contacts are protected against arcing by a condenser 28 connected as shown in Figure 4. The contact arms 12 and 13 are biased to open position by a spring 30 passing through an opening in the number 2 and having one end secured to the member 3 and the other end secured to a screw 31 having a tension adjusting nut 32 bearing against the armature arm 11. The rest position of the armature is determined by the stop 33 on this arm.

The insulating block 20 carries a U-shaped bimetallic lag element 35 having one end secured by a screw 36 and the other end 37 secured in electrical contact with the shaft of pivot 22. Also secured on the insulating block 20 is a contact plate 38 which carries the previously mentioned contact 27, and has a portion disposed beneath the free end of bimetallic element 35 for engagement thereby when the latter is heated. Cooperating contact elements may be provided on the plate 38 and the loop of the element 35 if desired. A screw 39 serves as a mounting means for the contact plate 38 and as the signal terminal of the relay.

A wound resistance element 40 is supported at one end by a terminal bracket 41 secured to the outer end of the insulating block 20, and supported at its other end by the screw 36, the ends of the resistance wire on this unit being connected with the bracket 41 and the screw 36 respectively. The screw 36 also pivotally carries a slider or wiper arm 42 arranged for movement over the length of the resistance element. The terminal bracket 41 is carried by a terminal screw 43 which also supports the contact 25 and provides electrical connection therewith, the screw 43 constituting the switch terminal of the relay, to be connected with the motor contactors. The movable contact 24, which is insulated from the overload contact carrier 21, is connected through a flexible lead 44 to a terminal 45 which constitutes the negative terminal of the relay.

The relay structure is preferably totally enclosed to exclude dust and atmospheric dampness. It is capable of being thoroughly sealed for use in combustible atmospheres. Ambient temperature variation effects may be rendered negligible by allowing a sufficiently large current through the bimetallic element and may be compensated for by proper adjustment of the element. The operation of the voltage coil 5 is practically unaffected by such variation. The relay may be designed for either A. C. or D. C. use.

In operation, when the current in the series bar 15 increases to a value which sets up a field about the bar of a magnitude sufficient to develop a force to overcome the pull of the armature spring the armature closes toward the pole pieces so as to bring the relatively stiff contact arm 13 to bear against contact 26 on the overload contact carrier 21. This action is herein referred to as the primary movement of the armature. As will be seen with reference to Figure 4 this primary movement closes a circuit through bimetallic strip 35, this circuit including the armature 9, the overload contact carrier 21, and supporting pivot 22 to the bimetal element. From the bimetal element the circuit is completed through the screw 38, the slider 42 and contact 25 which through contact 24 is connected with the negative terminal 45 of the relay.

The current through the bimetal strip 35 heats this element with a rapidity depending upon metering by the variable resistance setting, and as it heats it deflects downwardly until its free end makes contact with the plate 38. This action energizes the voltage coil 5 which exerts a sufficiently strong pull on the armature to rotate the overload contact arm 21 on its pivot and separate the contacts 24 and 25, which opens the circuit through the bimetal element allowing it to cool and return to its original position. This secondary movement of the armature when the voltage coil is energized also brings the contact arm 12 into engagement with the contact 27 to establish an independent lock-in circuit from the voltage bar 15 through the coil 5 so that, as the bimetallic element cools, the controlled external circuits will be maintained in their required conditions.

Figure 3:
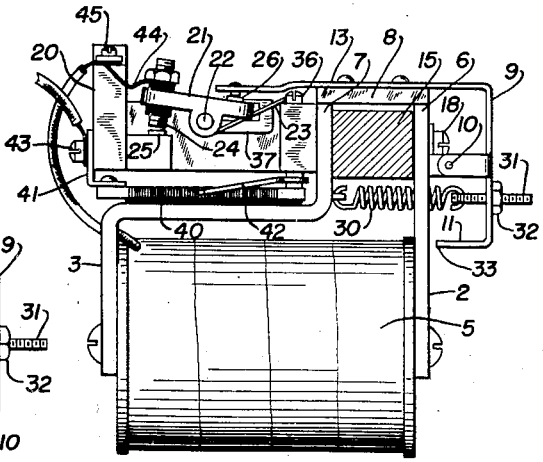
Figure 3 is a side elevational view.

The maximum value of surge current in the series bar 15 which is ineffective to trip the relay is governed by the strength of the torsional spring 23 which maintains the contacts 24 and 25 in engagement. Surge currents in the series bar having a value less than this maximum, but sufficient to actuate the armature, will be effective to produce only the primary movement of the armature, bringing the stiff contact arm 13 into engagement with the contact 26 without separating the contacts 24 and 25 and without producing engagement of the contact arm 12 with the contact 27. Currents in the series bar of a value greater than this maximum will actuate the armature through both its primary and secondary movements in a single motion to rock the overload contact carrier 21 into the position shown in Figure 3, separating the contacts 24 and 25 and also effecting engagement of the contact arm 12 with the contact 27.

Such a surge current will thus immediately establish a holding circuit through the series coil 5 regardless of how short the duration of the surge may be, provided that the impulse is sufficient to once establish the holding circuit.

When the surge current is insufficient to cause the armature to rock the overload contact carrier and establish the holding circuit through 12, 27 the bimetal strip provides a time lag during which interval the relay is free to return the external controlled circuits to their original condition if the surge passes. If the surge continues beyond this time interval the bimetal lag element proceeds to establish a holding circuit in the manner described to permanently maintain the externally controlled circuits in the condition established by the relay.

Rough adjustment of the time lag may be accomplished by bending the bimetal strip so as to vary the distance the free end must travel before it engages the contact plate 38. Fine adjustment is made by means of the side wire arm 42 in the series resistance circuit. The bimetal element 35 is preferably made of thin high resistance alloy bimetal formed to give a long current path for development of heat and to provide a member sufficiently rigid to be reasonably free from vibration response and for dependability and uniformity of action.

The relay is set for tripping at a definite value of overload current by adjusting the tension of the armature spring 30 through the nut 32, the armature stop 33 being designed to give a magnetic air gap suitable for the condition peculiar to the application of the relay.

Since the voltage coil flux and the series bar flux should be additive, the direction of the current in the series bar is important to the proper operation of the relay and one end of the series bar should accordingly be marked "positive" so that when the device is connected in circuit the series field will be in agreement with the established direction of voltage coil field.

When the relay is tripped, the contacts 13 and 26 move relatively with a strong wiping action which is effective in cleaning away deposits left by continued momentary flashing caused by line surges of short duration.

Figure 4 illustrates an application of the present relay for overload protection in conjunction with a two-directional D. C. cranking motor controlled by a manual double pole double throw switch through two magnetic contactors supplying current to either of two series fields in the motor. The present relay protects the system during rotation in either direction by providing an overload shut-off and alarm system. A double pole double throw switch 50 completes a negative circuit from a supply 49 to one or the other of contactors 51 and 52. When it is desired to reverse the motor the switch 50 is thrown to the opposite pair of poles opening the negative side of the line to reset the relay and release one of the contactors before energizing the other. The numeral 53 indicates the motor armature having associated therewith fields 54 and 55 whose circuits are controlled selectively for opposite directions of rotation by the contactors 51 and 52. The power circuits are indicated by heavy lines in Figure 4 and the control circuits are indicated by light lines.

In operation, the contacts 24 and 25 are normally in engagement to complete a circuit between the relay terminals 45 and 43 through one or the other of contactors 51 and 52 depending upon the position of the switch 50. A momentary surge or overload which is insufficient to produce both primary and secondary relay movements to immediately open contacts 24 and 25 has no immediate effect on the power circuit. However, if this overload maintains contact arm 13 in engagement with contact 26 until the bimetallic element 35 engages contact plate 38 the resulting energization of voltage coil 5 produces the secondary movement of the relay armature which is necessary to separate contacts 24 and 25 to release the contactor 51 or 52 which has been causing motor operation. The engagement of contacts 12 and 27 in the secondary movement of the relay also energizes a signal 56 indicating that the motor circuit has been opened by the relay.

In Figure 4, the motor armature 53 may be considered as operating a retractive gear of the type described wherein the relay 1 functions as a limit switch to de-energize the power contactor upon slippage of the motor clutch at the limit of travel of a nut cranked along a screw in the retraction gear. Thus, it will be seen that stoppage of the nut occasioned either by complete operation or jamming of the mechanism will, through slippage of the motor clutch, cause an overload in power circuit sufficient to open that circuit and operate a signal. The pilot or engineer is thus apprised of the cessation of operation of the gear, and is also apprised of the opening of the power circuit to prevent an undue drain on the ship's electrical system in the event of failure of the retraction gear to properly operate.

The present relay is of simple and rugged construction and may be made small in size and light in weight to conform with aircraft requirements. Power consumption by the relay is negligibly small, a very low wattage being consumed to maintain the device locked in. The large series bar 15 is designed to add very little to the line drop in the power circuit for the required currents. The device is satisfactorily operable in any position and is unaffected by vibration, through use of a balanced armature and relatively strong spring loading on the movable parts.

The illustrated embodiment is to be considered as illustrative of the principles of the invention and is not to be considered as limiting the scope thereof. Various changes may be made in the construction and arrangement of the parts and all such variations and modifications as fall within the scope of the appended claims are included in the invention.

I claim:

1. An overload relay comprising a magnetic circuit, a power conductor arranged to produce a magnetizing flux in said circuit, a resilient abutment contact, an armature in said magnetic circuit having a primary movement bringing it into engagement with said resilient abutment contact, a time delay device arranged for actuation by said engagement, a coil in said magnetic circuit operable to produce a secondary movement of said armature against the reaction of said resilient abutment contact, means operable by said time delay device to energize said coil, external circuit controlling means operable by said secondary movement, and a holding circuit for said coil energized by said secondary movement, a current surge in said power conductor below a predetermined maximum value being operative to produce said primary movement only, and a surge above said maximum value being operative to produce both primary and secondary movements at once, without a time delay.

2. An overload relay comprising a magnetic circuit, a power conductor arranged to produce a magnetizing flux in said circuit, a resilient abutment contact, an armature in said magnetic circuit having a primary movement bringing it into engagement with said resilient abutment contact, a time delay device arranged for actuation by said engagement, means operable by said delay device to produce a secondary movement of said armature displacing said abutment contact, a power control switch having a contact on said resilient abutment mechanically operable by the displacement of said abutment contact, and a holding circuit for said armature established by said secondary movement.

3. An overload relay comprising a magnetic circuit including a movable armature, a power conductor arranged to produce a flux for magnetizing said circuit to produce at least a primary movement of said armature, a holding coil for magnetizing said circuit, a pair of contacts carried by said armature, a spring tensioned resilient abutment contact arranged for engagement by one of said armature contacts upon a primary movement of said armature, a bimetallic delay element having a heater circuit established by said engagement, contact means operable by said delay element to energize said holding coil to produce a secondary movement of said armature displacing said abutment contact, a power control switch operable by the displacement of said abutment contact, and an additional holding coil circuit and a signal circuit established by the other of said armature contacts upon said secondary movement.

4. An overload relay comprising a magnetic circuit including a movable armature, adjustable spring tensioning means for said armature, a power conductor arranged to produce a flux for magnetizing said circuit to produce at least a primary movement of said armature, a holding coil for magnetizing said circuit, a pair of contacts carried by said armature, a spring tensioned resilient abutment contact arranged for engagement by one of said armature contacts upon a primary movement of said armature, a bimetallic delay element having a heater circuit established by said engagement, contact means operable by said delay element to energize said holding coil to produce a secondary movement of said armature displacing said abutment contact, a power control switch operable by the displacement of said abutment contact, an additional holding coil circuit and a signal circuit established by the other of said armature contacts upon said secondary movement, and a variable resistance for controlling the heating current in said bimetallic heater circuit to regulate the delay between said primary and secondary movements produced by said delay element.

ALPHONSE PERRON GAUVREAU.

REFERENCES CITED

The following references are of record in the file of this patent:

UNITED STATES PATENTS

| Number | Name | Date |
|---|---|---|
| 417,926 | Lane | Dec. 24, 1889 |
| 624,895 | Scott | May 9, 1899 |
| 863,185 | Jeffries | Aug. 13, 1907 |
| 1,716,357 | Erickson | June 4, 1929 |
| 1,728,038 | Burstyn | Sept. 10, 1929 |
| 1,774,966 | Eaton | Sept. 2, 1930 |
| 1,868,256 | Rippl | July 19, 1932 |
| 2,087,216 | Betz | July 13, 1937 |